United States Patent
Okamoto

(10) Patent No.: US 9,807,417 B2
(45) Date of Patent: Oct. 31, 2017

(54) IMAGE PROCESSOR

(71) Applicant: MegaChips Corporation, Osaka-shi (JP)

(72) Inventor: Akira Okamoto, Osaka (JP)

(73) Assignee: MegaChips Corporation, Osaka-shi (JP)

(*) Notice: Subject to any disclaimer, the term of this patent is extended or adjusted under 35 U.S.C. 154(b) by 364 days.

(21) Appl. No.: 14/572,887

(22) Filed: Dec. 17, 2014

(65) Prior Publication Data

US 2015/0172706 A1  Jun. 18, 2015

(30) Foreign Application Priority Data

Dec. 17, 2013 (JP) ................................. 2013-260618

(51) Int. Cl.
| H04N 19/57 | (2014.01) |
| H04N 19/593 | (2014.01) |
| H04N 19/176 | (2014.01) |
| H04N 19/139 | (2014.01) |
| H04N 19/172 | (2014.01) |
| H04N 19/423 | (2014.01) |

(52) U.S. Cl.
CPC ........... *H04N 19/57* (2014.11); *H04N 19/423* (2014.11)

(58) Field of Classification Search
None
See application file for complete search history.

(56) References Cited

U.S. PATENT DOCUMENTS

| 8,325,798 | B1* | 12/2012 | Cismas | H04N 19/573 345/536 |
| 9,122,609 | B2* | 9/2015 | Budagavi | G06F 12/0844 |
| 2004/0141554 | A1* | 7/2004 | Phong | H04N 19/433 375/240.12 |
| 2005/0047510 | A1* | 3/2005 | Yamaguchi | H04N 19/423 375/240.26 |
| 2005/0089098 | A1* | 4/2005 | Sato | H04N 19/57 375/240.16 |
| 2006/0140277 | A1* | 6/2006 | Ju | H04N 19/426 375/240.25 |
| 2006/0244819 | A1* | 11/2006 | Pun | H04N 7/15 348/14.09 |
| 2006/0291568 | A1* | 12/2006 | Suzumura | H04N 19/61 375/240.24 |
| 2007/0183508 | A1* | 8/2007 | Kudo | H04N 19/176 375/240.25 |
| 2009/0073277 | A1* | 3/2009 | Numata | H04N 19/139 348/222.1 |

(Continued)

FOREIGN PATENT DOCUMENTS

JP  5147102  2/2013

*Primary Examiner* — Kate Luo
(74) *Attorney, Agent, or Firm* — Oblon, McClelland, Maier & Neustadt, L.L.P.

(57) ABSTRACT

The codec processor includes an SRAM that holds a reference image read from an image storage, and a motion search unit that performs motion search on the basis of a reference image held in the SRAM to generate a prediction block for a target block in an input image. The SRAM holds a reference image having a horizontally equivalent number of pixels to a horizontal number of pixels of the input image and a number of pixels vertically larger than or equal to a vertical motion search range.

13 Claims, 10 Drawing Sheets

(56) References Cited

U.S. PATENT DOCUMENTS

| | | | | |
|---|---|---|---|---|
| 2009/0245374 A1* | 10/2009 | Hsu | ............... | H04N 19/105 375/240.16 |
| 2010/0037013 A1* | 2/2010 | Okamoto | ............ | G06F 12/0607 711/105 |
| 2011/0235716 A1* | 9/2011 | Tanaka | ............... | H04N 19/44 375/240.16 |
| 2012/0275516 A1* | 11/2012 | Tanaka | ............... | H04N 19/50 375/240.12 |
| 2013/0251039 A1* | 9/2013 | Drugeon | ......... | H04N 19/00733 375/240.14 |
| 2014/0369562 A1* | 12/2014 | Saito | ............... | H04N 19/433 382/103 |
| 2015/0016750 A1* | 1/2015 | Saito | ............... | G06F 17/3028 382/305 |

\* cited by examiner

IMAGE PROCESSOR

CROSS REFERENCE TO RELATED APPLICATIONS

The present application is based on, and claims priority from Japanese Patent Application Serial Number 2013-260618, the disclosure of which is hereby incorporated by reference herein in its entirety.

BACKGROUND

Technical Field

The present disclosure relates to an image processor.

Related Art

An encoder according to one technique of H.264 includes a DRAM as image storage for storing a local decoded image, an SRAM that holds a reference image read from the DRAM, and a motion search unit that performs motion search on the basis of a reference image to generate a prediction block. Then the encoder performs DCT transformation, quantization, and entropy coding on a prediction error, which is a difference between a target macroblock and a prediction block, so as to realize highly efficient data compression. The SRAM stores an image in a predetermined search range, which is slightly broader than a macroblock, of a local decoded image of one frame stored in the DRAM, as a reference image.

A decoder according to one technique of H.264 includes a DRAM as image storage for storing a decoded image, an SRAM that holds a reference image read from the DRAM, and a motion search unit that performs motion search on the basis a reference image to generate a prediction block. Then the decoder performs entropy decoding, dequantization, and inverse DCT transformation on the input coded data to generate a prediction error, and reconstitutes the input image on the basis of the prediction block and the prediction error to generate a decoded block. According to H.264, decoding is performed in a unit of a rectangular macroblock, and thus in writing a decoded block to a DRAM, a write access to the DRAM is performed with an address format in which addresses are successive between each row in a rectangular region (hereinafter, "codec format").

JP5,147,102B describes a method for accessing a memory suitable for a write access in a unit of a macroblock, by performing burst transfer while switching banks of the memory in writing a decoded image to the memory.

The encoder according to the above-described technique requires, if no highly correlative block of a target macroblock is found in a reference image (that is, a cache mishit), reading a reference image in another region from the DRAM and storing in the SRAM again. Thus read access to the DRAM occurs, causing prolonged processing time. Moreover, recent enhanced resolution of cameras and televisions increases access to data in the DRAM, while band of a bus in DRAM is becoming severe, which requires avoiding an access to the DRAM as much as possible to reduce band of a bus.

Furthermore, the decoder according to the above-described technique writes a decoded block to the DRAM in the codec format. Displaying the decoded image on a display device, however, requires image data in an address format in which addresses are successive horizontally in an image (raster format), and thus a decoded image in the codec format cannot be used without change. Thus a format conversion circuit needs to be implemented for conversion from the codec format into the raster format. The format conversion circuit converts the decoded image in the codec format read from the DRAM into the raster format and writes the converted decoded image to the DRAM. Thus read access from and write access to the DRAM occur due to format conversion, causing prolonged delay time for display and increase in power consumption by the DRAM. Moreover, as described above, reduction in band of a bus by avoiding an access to the DRAM as much as possible is required.

SUMMARY

The present disclosure is directed to providing an image processor that increases a cache hit ratio of a reference image to achieve shortening of processing time and reduction in band of a bus. Moreover, the present disclosure is directed to provide an image processor that omits format conversion for display to achieve shortening of delay time, reduction in power consumption, and reduction in band of a bus.

An image processor according to an aspect of the present disclosure includes a codec processor that codes an input image, and an image storage accessible by the codec processor. The codec processor includes a reference image holding unit that holds a reference image read from the image storage, and a motion search unit that performs motion search on the basis of a reference image held in the reference image holding unit to generate a prediction block for a target block in the input image. The reference image holding unit holds a reference image having a horizontally equivalent number of pixels to a horizontal number of pixels of the input image and a number of pixels vertically larger than or equal to a vertical motion search range.

These and other objects, features, aspects and advantages of the present disclosure will become more apparent from the following detailed description when taken in conjunction with the accompanying drawings.

DETAILED DESCRIPTION

Figure 1:
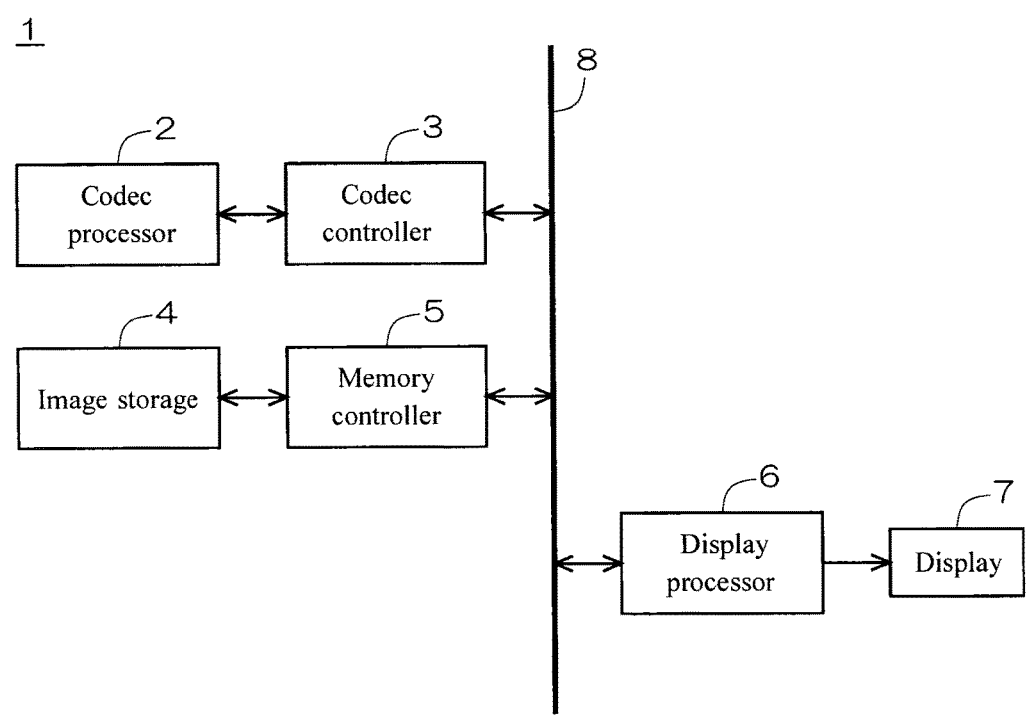
FIG. 1 is a simplified diagram illustrating a configuration of an image processor according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

According to a first aspect of an image processor, a reference image holding unit holds a reference image having a horizontally equivalent number of pixels to a horizontal number of pixels of an input image and a number of pixels vertically larger than or equal to a vertical motion search range. Thus the motion search unit is capable of generating an optimal prediction block reliably (that is, with the cache hit ratio of 100%) within a vertical search range on the basis of a reference image held in a reference image holding unit. This eliminates the need for a reference image in another region to be read from the image storage to the reference image holding unit, avoids occurrence of a read access to the image storage, and in consequence realizes shortening of processing time and reduction in band of a bus.

According to another aspect, the reference image holding unit holds a reference image having horizontally and vertically equivalent number of pixels respectively to horizontal and vertical number of pixels of the input image. In other words, the reference image holding unit holds a reference image of one frame. Thus the motion search unit is capable of reliably identifying the most highly correlative block to the target block in the reference image of one frame held in the reference image holding unit, and accordingly highly accurate prediction block is generated. Moreover, without need for updating a reference image depending on a vertical position of the target block, occurrence of a read access to the image storage is avoided, and in consequence, shortening of processing time and reduction in band of a bus is effectively realized.

According to another aspect, the codec processor includes a prediction error generator that generates a prediction error on the basis of a target block and a prediction block, a local decoded block generator that reconstitutes the target block on the basis of the prediction error and the prediction block to generate a local decoded block, and a local decoded block holding unit that holds multiple local decoded blocks. The local decoded block generator writes the sequentially generated N local decoded blocks to the local decoded block holding unit with these sequentially generated N local decoded blocks aligned row-wise. The local decoded block holding unit writes the N local decoded blocks held in itself to the image storage by burst transfer in a unit of a row across the N local decoded blocks. In other words, processing up to storing of the local decoded blocks in the local decoded block holding unit is performed in a unit of a block, and writing of the local decoded blocks from the local decoded block holding unit to the image storage is performed by a memory access using a raster format. Such simple memory access using a raster format achieves a simple way of writing local decoded blocks to the image storage. Moreover, burst transfer targeting at N local decoded blocks aligned row-wise in a raster format achieves efficient burst transfer.

According to another aspect, the image storage includes multiple memory banks. The local decoded block holding unit writes pixel data belonging to a first row in the N local decoded blocks held in itself to a first memory bank of the image storage and writes pixel data belonging to a second row adjacent to the first row to a second memory bank different from the first memory bank. By writing pixel data of adjacent rows to different memory banks, writing of pixel data belonging to the second row is started upon completion of writing of pixel data belonging to the first row. As a result, without latency that would otherwise occur during successive access to the same memory bank, time required for writing is effectively shortened.

According to another aspect, the local decoded block holding unit holds N+1 local decoded blocks. During first to N-th block terms, the local decoded block generator sequentially writes first to N-th local decoded blocks to the local decoded block holding unit. During an (N+1)-th block term, the local decoded block generator writes an (N+1)-th local decoded block to the local decoded block holding unit and the local decoded block holding unit writes the first to N-th local decoded block to the image storage. Thus writing and reading of the local decoded blocks to and from the local decoded block holding unit is performed concurrently. Moreover, a storage capacity to hold N+1 local decoded blocks is sufficient for the local decoded block holding unit, and thus storage capacity is reduced in comparison with implementing the local decoded block holding unit that holds 2N local decoded blocks.

According to another aspect, the image storage holds a local decoded image for use as a reference image. The image storage writes the N local decoded blocks aligned row-wise in local decoded image to the reference image holding unit by burst transfer in a unit of a row across the N local decoded blocks. In other words, reading of the local decoded image from the image storage is performed by a memory access using a raster format. Such simple memory access using a raster format facilitates reading of the local decoded image from the image storage. Moreover, burst transfer targeting at N local decoded blocks aligned row-wise in a raster format achieves efficient burst transfer.

According to another aspect, the image processor includes a display processor to process image data to display an image on a display. The image storage transfers the local decoded image held in itself to the display processor by burst transfer in a unit of a row. By storing a local decoded image in a raster format in the image storage, image data in a raster format required to display an image on the display is made available for transfer from the image storage to the display processor. Thus implementation of a format converter to convert a local decoded image in a codec format to a local decoded image in a raster format is omitted. In consequence, eliminating a need for access from the format converter to the image storage achieves shortening of delay time, reduction in power consumption, and reduction in band of a bus. Moreover, without a need for a memory access using a codec format, simplification of a design is achieved.

According to another aspect, a format converter converts a YUV format (for example, YUV420) of the local decoded image held in the image storage into a YUV format (for example, YUV422) compatible with the display. Thus even when the local decoded image held in the image storage is in a YUV format different from the one compatible with the display, the YUV format is converted so as to make the image available on the display.

An image processor according to another aspect includes a codec processor, a display processor that processes image data to display an image on a display, an image storage accessible by the codec processor and the display processor. The codec processor includes a reference image holding unit that holds a reference image read from the image storage, a motion search unit that performs motion search on the basis of a reference image held in the reference image holding unit to generate a prediction block for a target block, a prediction error generator that decodes coded data to generate a prediction error, a decoded block generator that reconstitutes an input image on the basis of a prediction block and a prediction error to generate a decoded block, and a decoded block holding unit that holds multiple decoded blocks. The decoded block generator writes the sequentially generated N decoded blocks to the decoded block holding unit with these sequentially generated N local decoded blocks aligned row-wise. The decoded block holding unit writes the N decoded blocks held in itself to the image storage by burst transfer in a unit of a row across the N decoded blocks. In other words, processing up to storing of the decoded blocks in the decoded block holding unit is performed in a unit of a block, and writing of the decoded blocks from the decoded block holding unit to the image storage is performed by a memory access using a raster format. Such simple memory access using a raster format achieves a simple way of writing decoded blocks to the image storage. Moreover, burst transfer targeting at N decoded blocks aligned row-wise in a raster format achieves efficient burst transfer. The image storage transfers a decoded image held in itself to the display processor by burst transfer in a unit of a row. By storing a decoded image in a raster format in the image storage, image data in a raster format required to display an image on the display is made available for transfer from image storage to the display processor. Thus implementation of a format converter to convert a decoded image in a codec format to a decoded image in a raster format is omitted. In consequence, eliminating a need for an access from the format converter to the image storage achieves shortening of delay time, reduction in power consumption, and reduction in band of a bus. Moreover, without a need for a memory access using a codec format, simplification of a design is achieved.

According to another aspect, a format converter converts a YUV format (for example, YUV420) of the decoded image held in the image storage into a YUV format (for example, YUV422) compatible with the display. Thus even when the decoded image held in the image storage is in a YUV format different from the one compatible with the display, the YUV format is converted to make the image available on the display.

According to another aspect, the decoded block holding unit writes pixel data belonging to a first row in the N decoded blocks held in itself to a first memory bank of the image storage, and writes pixel data belonging to a second row adjacent to the first row to a second memory bank different from the first memory bank. By writing pixel data of adjacent rows to different memory banks, writing of pixel data belonging to the second row is started upon completion of writing of pixel data belonging to the first row. As a result, without latency that would otherwise occur during successive access to the same memory bank, time required for writing is effectively shortened.

According to another aspect, the decoded block holding unit holds N+1 decoded blocks. During first to N-th block terms, the decoded block generator sequentially writes first to N-th decoded blocks to the decoded block holding unit. During an (N+1)-th block term, the decoded block generator writes an (N+1)-th decoded block to the decoded block holding unit, and the decoded block holding unit writes the first to N-th decoded blocks to the image storage. Thus writing and reading of the decoded block to and from the decoded block holding unit are performed concurrently. Moreover, a storage capacity to hold N+1 decoded blocks is sufficient for the decoded block holding unit, and thus storage capacity required for the decoded block holding unit is reduced in comparison with implementing a decoded block holding unit for holding 2N decoded blocks.

According to another aspect, the image storage writes N decoded blocks aligned row-wise in the decoded image to the reference image holding unit by burst transfer in a unit of a row across the N decoded blocks. In other words, reading of the decoded image from the image storage is performed by a memory access using a raster format. Such simple memory access using a raster format facilitates reading of the decoded image from the image storage. Moreover, burst transfer targeting at N decoded blocks aligned row-wise in a raster format achieves efficient burst transfer.

Some embodiments of the present invention increases a cache hit ratio of a reference image to achieve shortening of processing time and reduction in band of a bus. Furthermore, some embodiments of the present invention omit format conversion for display to achieve shortening of delay time, reduction in power consumption, and reduction in band of a bus.

DESCRIPTION OF EMBODIMENTS

Embodiments of the present invention are described in detail below referring to the drawings. It should be noted that identical reference numerals throughout the drawings indicate identical or equivalent elements.

FIG. 1 is a simplified diagram illustrating a configuration of an image processor 1 according to an embodiment of the present invention. FIG. 1 illustrates a relation of connection of an image processor 1 including a codec processor 2, a codec controller 3, an image storage 4, a memory controller 5, a display processor 6, a display 7, and a bus 8. The image storage 4 includes, for example, a DRAM.

Figure 2:
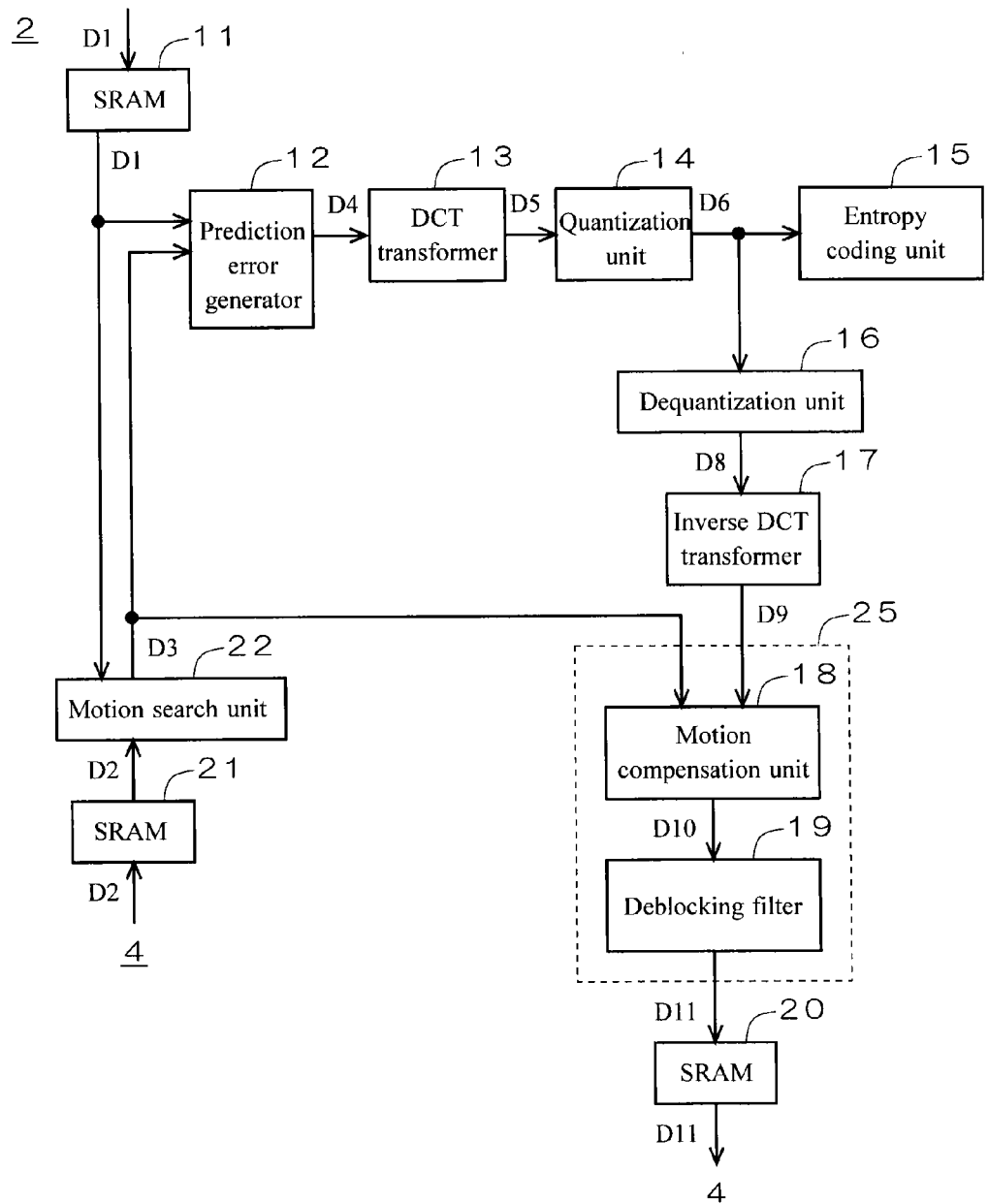
FIG. 2 is a simplified diagram illustrating a configuration of an encoder of the codec processor.

FIG. 2 is a simplified diagram illustrating a configuration of an H.264 encoder of the codec processor 2. FIG. 2 illustrates a relation of connection of the codec processor 2 including an SRAM 11, a prediction error generator 12, a DCT transformer 13, a quantization unit 14, an entropy coding unit 15, a dequantization unit 16, an inverse DCT transformer 17, a motion compensation unit 18, a deblocking filter 19, an SRAM 20, an SRAM 21, and a motion search unit 22. The motion compensation unit 18 and the deblocking filter 19 constitute a local decoded block generator 25.

Figure 3:
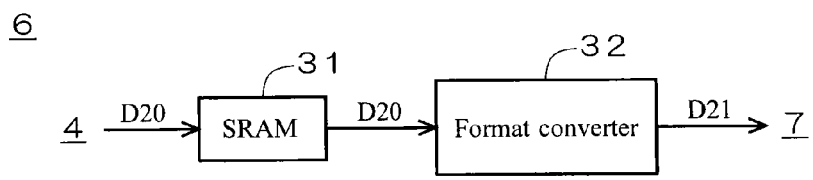
FIG. 3 is a simplified diagram illustrating a configuration of a display processor.

FIG. 3 is a simplified diagram illustrating a configuration of the display processor 6. FIG. 3 illustrates a relation of connection of the display processor 6 including an SRAM 31 and a format converter 32. In an example of the present embodiment, the codec processor 2 processes image data in YUV420 format, while the display 7 employs image data in YUV422 format to display an image. The format converter 32 converts image data D20 in YUV420 format transferred from the image storage 4 into image data D21 in YUV422 format that is compatible with the display 7.

Description is given below of the operation of the image processor 1 according to the present embodiment.

Referring to FIG. 2, image data D1 of an input macroblock to be coded is input through the SRAM 11 to the prediction error generator 12 and the motion search unit 22.

Image data D2 of a reference image is read from the image storage 4 and stored in the SRAM 21, so that the SRAM 21 holds the reference image.

Figure 4A:
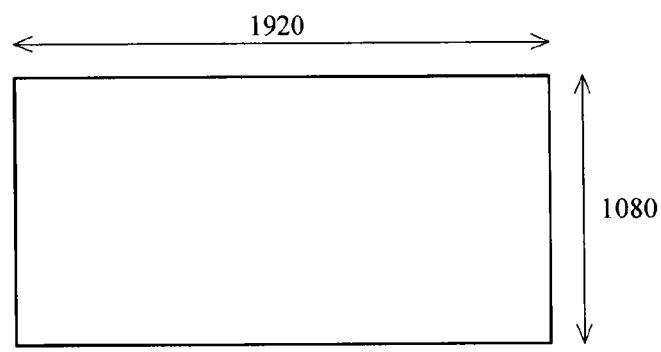
FIGS. 4A and 4B are diagrams illustrating a first example of a reference image in an SRAM.
Figure 4B:
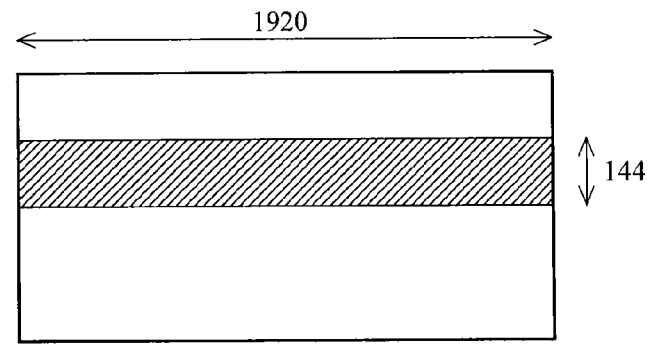

FIGS. 4A and 4B are diagrams illustrating a first example of the reference image held in the SRAM 21. The SRAM 21 holds a reference image having a horizontally equivalent number of pixels to a horizontal number of pixels of the input image and a vertically equivalent number of pixels to a vertical motion search range. In this example, the vertical motion search range is configured at a range of ±4 macroblocks from the position of the input macroblock. Since one macroblock includes pixels of 16 columns×16 rows, the vertical motion search range is 16×9=144 pixels. As illustrated in FIG. 4A, for an input image having, for example, pixels of 1920 columns×1080 rows, as illustrated in FIG. 4B, the SRAM 21 holds a reference image having pixels of 1920 columns×144 rows.

Figure 5A:
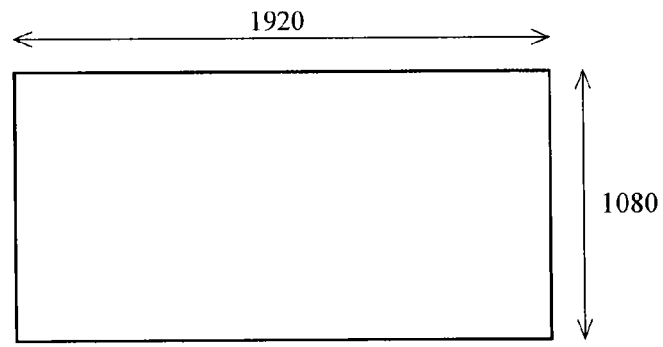
FIGS. 5A and 5B are diagrams illustrating a second example of the reference image in the SRAM.
Figure 5B:
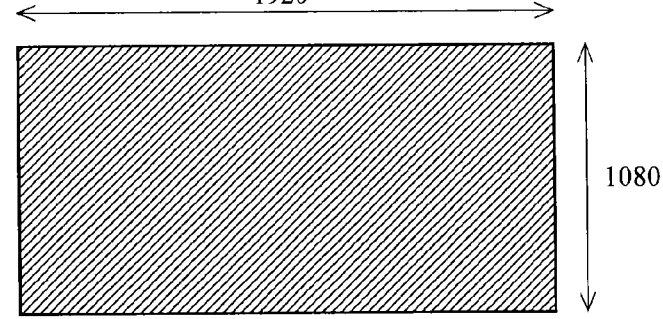

FIGS. 5A and 5B are diagrams illustrating a second example of the reference image held in the SRAM 21. The SRAM 21 holds a reference image having a horizontally and vertically equivalent number of pixels respectively to horizontal and vertical number of pixels of the input image. In other words, the SRAM 21 holds a reference image equivalent to one frame of the input image. As illustrated in FIG. 5A, for an input image having, for example, pixels of 1920 columns×1080 rows, as illustrated in FIG. 5B, the SRAM 21 holds a reference image having pixels of 1920 columns× 1080 rows.

Referring to FIG. 2, the motion search unit 22 performs motion search on the basis of the image data D1 input from the SRAM 11 and the image data D2 input from the SRAM 21, to generate a prediction block for the input macroblock. Image data D3 of the prediction block is input to the prediction error generator 12 and the motion compensation unit 18.

The prediction error generator 12 generates a prediction error on the basis of the image data D1 of the input macroblock and the image data D3 of the prediction block, and inputs image data D4 of the prediction error to the DCT transformer 13.

The DCT transformer 13 performs DCT transformation on the image data D4, and inputs DCT-transformed image data D5 to the quantization unit 14.

The quantization unit 14 quantizes the image data D5, and inputs quantized image data D6 to the entropy coding unit 15 and the dequantization unit 16.

The entropy coding unit 15 performs entropy coding on the image data D6 employing CABAC, CAVLC, or the like, and outputs coded data D7.

The dequantization unit 16 dequantizes the image data D6 and inputs dequantized image data D8 equivalent to the image data D5 to the inverse DCT transformer 17.

The inverse DCT transformer 17 performs inverse DCT transformation on the image data D8, and inputs inverse DCT-transformed image data D9 equivalent to the image data D4 of the prediction error to the motion compensation unit 18.

The motion compensation unit 18 reconstitutes the input macroblock equivalent to the image data D1 on the basis of the image data D3 of the prediction block and the image data D9 of the prediction error, so as to generate a local decoded block. Image data D 10 of the local decoded block is input to the deblocking filter 19.

The deblocking filter 19 performs a predetermined deblocking filtering on the image data D10, and stores the processed image data D11 in the SRAM 20. In other words, the local decoded block generator 25 generates the local decoded block on the basis of the prediction error (image data D9) and the prediction block (image data D3), and stores the generated local decoded block in the SRAM 20.

The image data D11 of the local decoded block is transferred from the SRAM 20 to the image storage 4. The image data D11 of the local decoded blocks of all macroblocks included in the input image is transferred to the image storage 4, so that the image storage 4 holds a local decoded image. The local decoded image is used as a reference image in processing a subsequent input image.

FIGS. 6A to 6D are diagrams illustrating processing by the local decoded block generator 25 to write the local decoded block to SRAM 20. The local decoded block generator 25 sequentially generates four local decoded blocks LDB1 to LDB4, corresponding to N input macroblocks MB1 to MB4 (in this example, N=4) aligned row-wise in the input image. Then the local decoded block generator 25 writes the four local decoded blocks LDB1 to LDB4 to the SRAM 20 with the four local decoded blocks LDB1 to LDB4 aligned row-wise. The details are as follows.

Figure 6A:
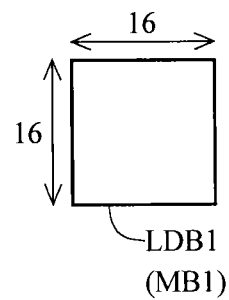
FIGS. 6A to 6D are diagrams illustrating processing by a local decoded block generator to write a local decoded block to an SRAM.

Firstly as illustrated in FIG. 6A, the local decoded block generator 25 generates a local decoded block LDB1 corresponding to an input macroblock MB1 during a first macroblock term. The local decoded block LDB1 is written to the SRAM 20.

Figure 6B:
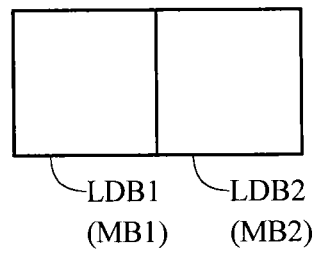

Then as illustrated in FIG. 6B, the local decoded block generator 25 generates a local decoded block LDB2 corresponding to an input macroblock MB2 next to the input macroblock MB1 during a second macroblock term. The local decoded block LDB2 is written to the SRAM 20 next to the local decoded block LDB1.

Figure 6C:
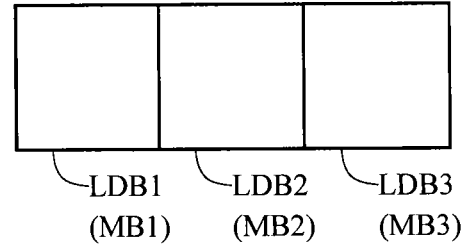

Then as illustrated in FIG. 6C, the local decoded block generator 25 generates a local decoded block LDB3 corresponding to an input macroblock MB3 next to the input macroblock MB2 during a third macroblock term. The local decoded block LDB3 is written to the SRAM 20 next to the local decoded block LDB2.

Figure 6D:
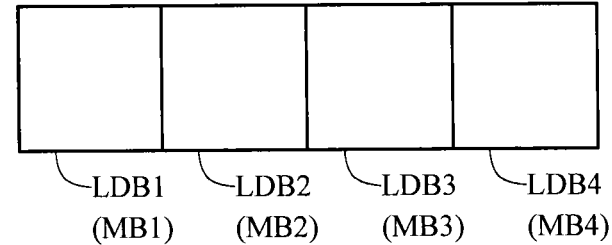

Then as illustrated in FIG. 6D, the local decoded block generator 25 generates a local decoded block LDB4 corresponding to an input macroblock MB4 next to the input macroblock MB3 during a fourth macroblock term. The local decoded block LDB4 is written to the SRAM 20 next to the local decoded block LDB3.

Figure 7:
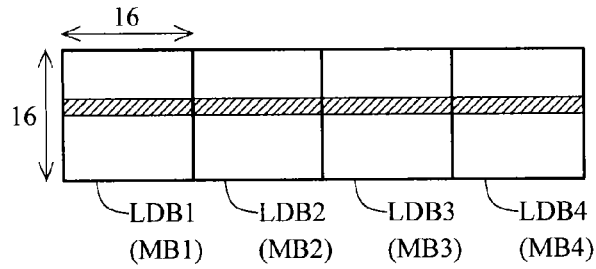
FIG. 7 is a diagram illustrating transfer of the local decoded blocks from the SRAM to an image storage.
Figure 8:
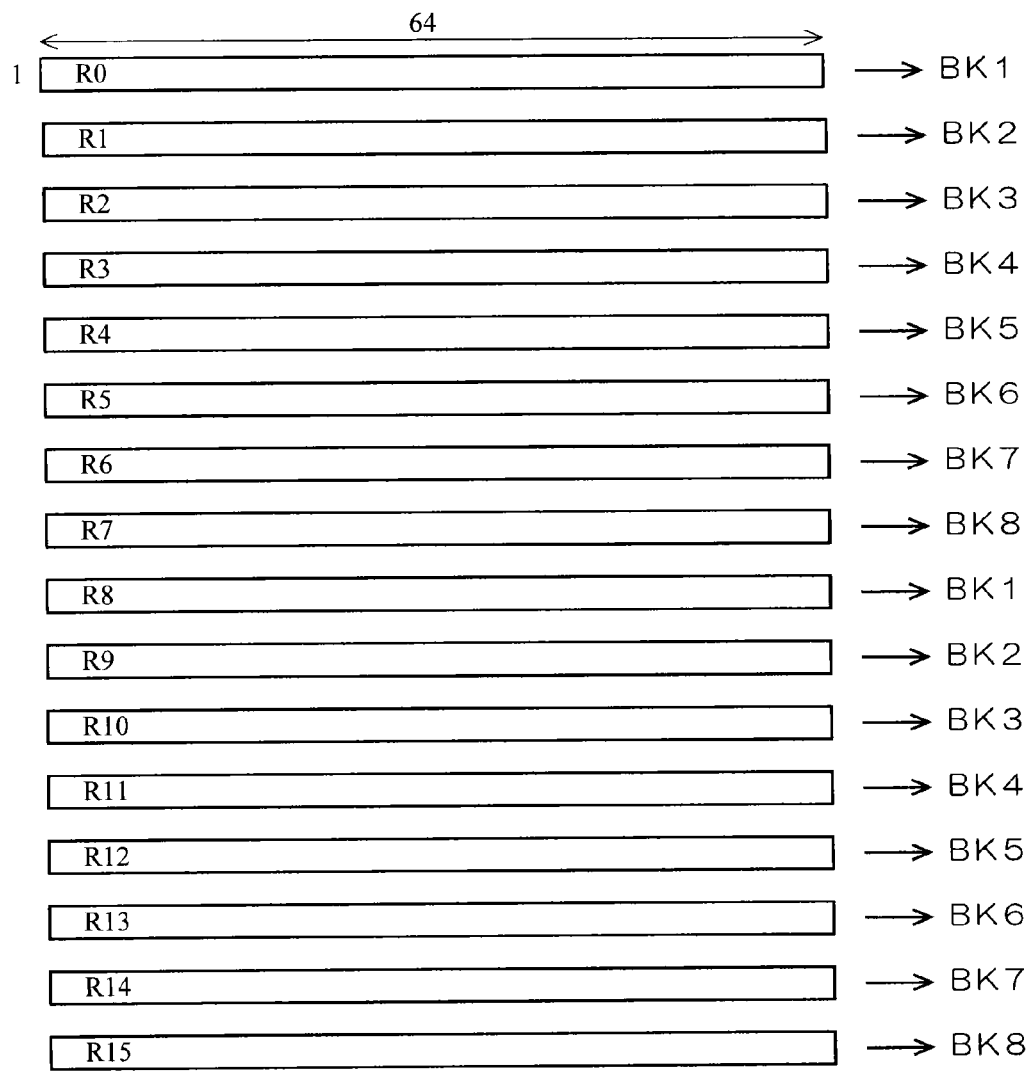
FIG. 8 is a diagram illustrating transfer of the local decoded block from the SRAM to the image storage.

FIGS. 7 and 8 are diagrams illustrating transfer of the local decoded blocks from the SRAM 20 to the image storage 4. Transfer of local decoded blocks from the SRAM 20 to the image storage 4 is performed by a memory access using a raster format. In other words, burst transfer in a unit of a row (64 columns×1 row) across the four local decoded blocks LDB1 to LDB4 held in the SRAM 20 is repeated column-wise 16 times, so that the local decoded blocks LDB1 to LDB4 are written to the image storage 4.

The image storage 4 includes multiple (in this example, eight) memory banks BK1 to BK8, to different one of which pixel data pieces of adjacent rows are written. Referring to FIG. 8, pixel data R0 of 64 columns×1 row belonging to the 0th row is firstly written to the memory bank BK1 of the image storage 4, pixel data R1 belonging to the first row is written to the memory bank BK2, and then pixel data R2 belonging to the second row is then written to the memory bank BK3. Similarly, pixel data R3 to R7 belonging to the third to seventh rows are respectively written to the memory banks BK4 to BK8 sequentially. Furthermore, pixel data R8 to R15 belonging to the eighth to 15th rows are respectively written to the memory banks BK1 to BK8 sequentially.

In the example of the present embodiment, since the local decoded image is in the YUV420 format, pixel data belonging to even-numbered rows includes only luminance data, while pixel data belonging to odd-numbered rows includes luminance and chrominance data. Specifically, even-numbered rows include one piece of luminance data per pixel, while odd-numbered rows include one piece of luminance data and one piece of chrominance data per pixel. In other words, odd-numbered rows include twice as much data as even-numbered rows. Thus by setting the burst length of odd-numbered rows in data transfer to two times that of even-numbered rows in burst transfer, luminance data for one row is written to the image storage 4 by one burst transfer for an even-numbered row, while luminance and chrominance data for one row is written to the image storage 4 by one burst transfer for an odd-numbered row. Contrary to the above, pixel data belonging to even-numbered rows may include luminance and chrominance data, and pixel data belonging to odd-numbered rows may include only luminance data. Then by setting the burst length of even-numbered rows in data transfer to two times that of odd-numbered rows in burst transfer, luminance data for one row is written to the image storage 4 by one burst transfer for an odd-numbered row, while luminance and chrominance data for one row is written to the image storage 4 by one burst transfer for an even-numbered row.

Moreover, the local decoded image may be in the YUV422 format. Then even-numbered and odd-numbered rows include the same amount of data, and thus the burst length in data transfer is common between even-numbered and odd-numbered rows.

Figure 9:
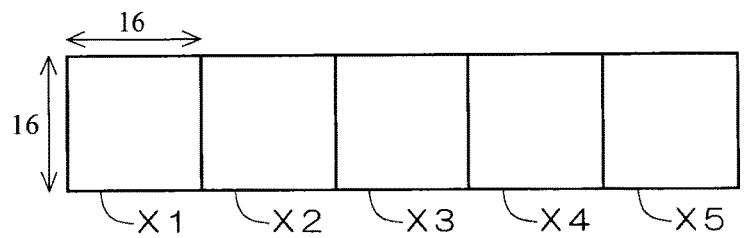
FIG. 9 is a diagram illustrating a first example of a configuration of the SRAM.
Figure 10:
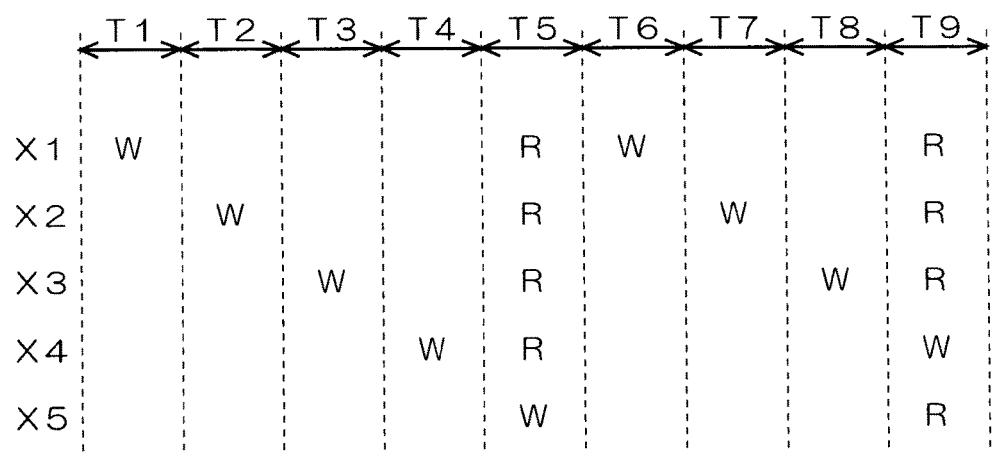
FIG. 10 is a diagram illustrating a timing for reads and writes of local decoded blocks from and to the SRAM, corresponding to FIG. 9.

FIG. 9 is a diagram illustrating a first example of a configuration of the SRAM 20. FIG. 10 is a diagram illustrating a timing for reads and writes of local decoded blocks from and to the SRAM 20, corresponding to FIG. 9.

Referring to FIG. 9, the SRAM 20 includes a total of N+1 (in this example, five) storage areas X1 to X5, each being capable of storing one local decoded block. Referring to FIG. 10, the local decoded blocks LDB1 to LDB4 are respectively written to the storage areas X1 to X4 during macroblock terms T1 to T4. Then during a macroblock term T5, the local decoded blocks LDB1 to LDB4 are read from the storage areas X1 to X4 by burst transfer in a raster format, and the local decoded block LDB5 is written to the storage area X5. Then similarly, the local decoded blocks LDB6 to LDB8 are respectively written to the storage areas X1 to X3 during macroblock terms T6 to T8, and during a macroblock term T9, the local decoded blocks LDB5, LDB6, LDB7, and LDB8 are read from the storage areas X5, X1, X2, and X3 by burst transfer in a raster format and the local decoded block LDB9 is written to the storage area X4.

Figure 11:
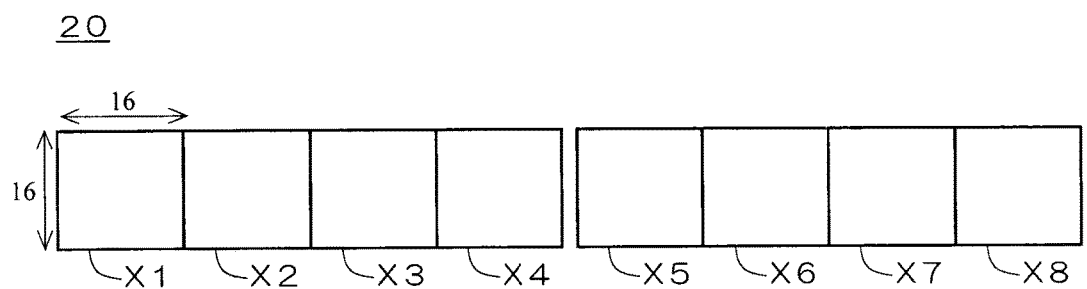
FIG. 11 is a diagram illustrating a second example of a configuration of the SRAM.
Figure 12:
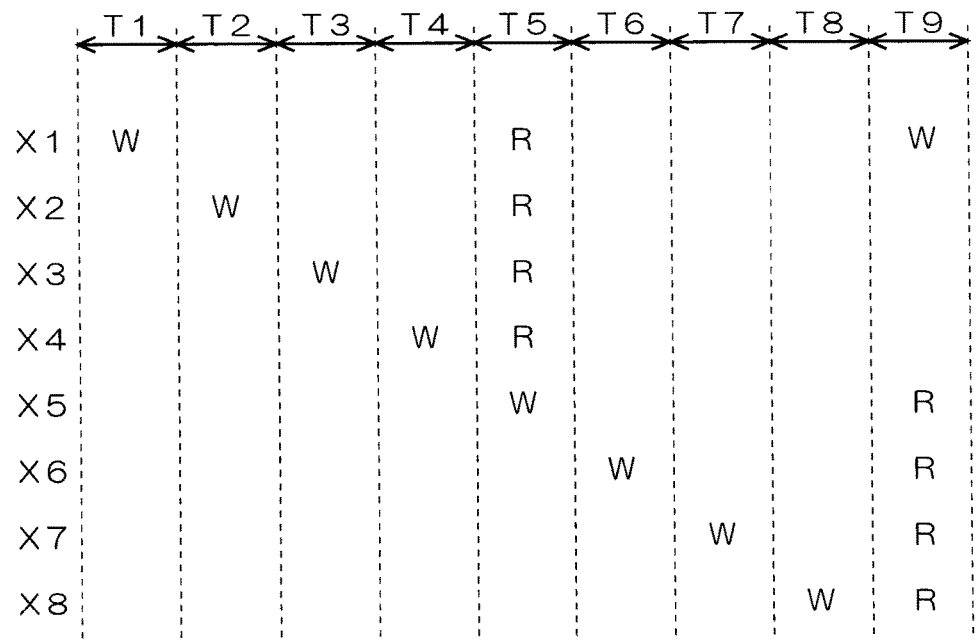
FIG. 12 is a diagram illustrating a timing for reads and writes of the local decoded blocks from and to the SRAM, corresponding to FIG. 11.

FIG. 11 is a diagram illustrating a second example of a configuration of the SRAM 20. FIG. 12 is a diagram illustrating a timing for reads and writes of local decoded blocks from and to the SRAM 20, corresponding to FIG. 11.

Referring to FIG. 11, the SRAM 20 includes a total of 2N (in this example, eight) storage areas X1 to X8, each being capable of storing one local decoded block.

Referring to FIG. 12, the local decoded blocks LDB1 to LDB4 are respectively written to the storage areas X1 to X4 during the macroblock terms T1 to T4. Then during the macroblock term T5, the local decoded blocks LDB1 to LDB4 are read from the storage areas X1 to X4 by burst transfer in a raster format, and the local decoded block LDB5 is written to the storage area X5. Then similarly, the local decoded blocks LDB6 to LDB8 are respectively written to the storage areas X6 to X8 during the macroblock terms T6 to T8, and during the macroblock term T9, the local decoded block LDB5 to LDB8 are read from the storage areas X5 to X8 by burst transfer in a raster format and the local decoded block LDB9 is written to the storage area X1.

FIGS. 13A to 13D are diagrams illustrating transfer of image data from the image storage 4 to the SRAM 21. Transfer of image data from the image storage 4 to the SRAM 21 is performed by burst transfer using a raster format in a unit of four macroblocks, similar to transfer of the local decoded block from the SRAM 20 to the image storage 4.

Figure 13A:
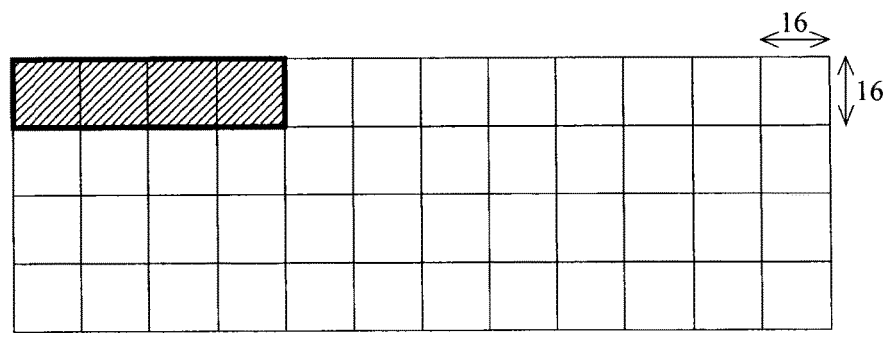
FIGS. 13A to 13D are diagrams illustrating transfer of image data from the image storage to the SRAM.

As illustrated in FIG. 13A, burst transfer starting from the top-left corner of a reference image in a unit of a row (64 columns×1 row) across the four local decoded blocks held in the image storage 4 is repeated column-wise 16 times, so that four local decoded blocks are written to the SRAM 21.

Figure 13B:
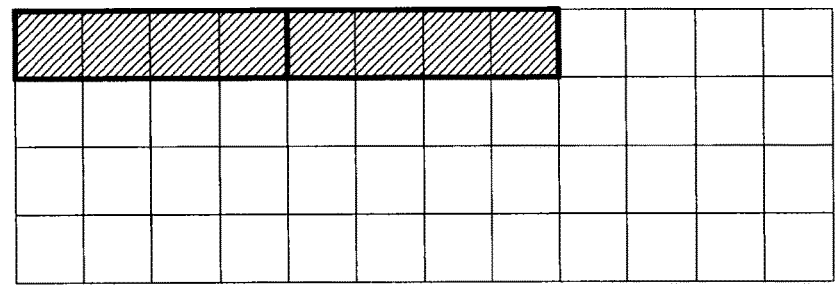
Figure 13C:
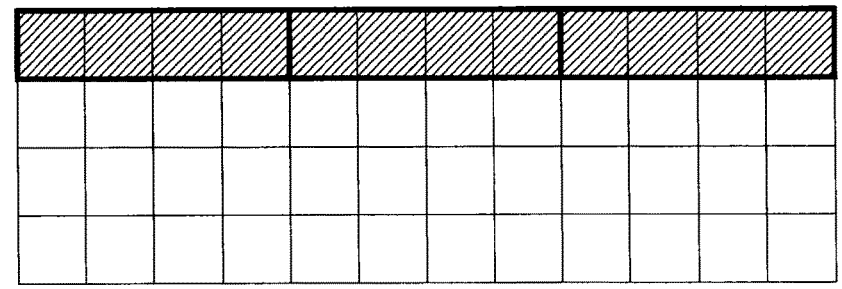

Then as illustrated in FIGS. 13B and 13C, similar data transfer proceeds to the right within the macroblock line on the first tier, so that the local decoded blocks are written to the SRAM 21 four by four.

Figure 13D:
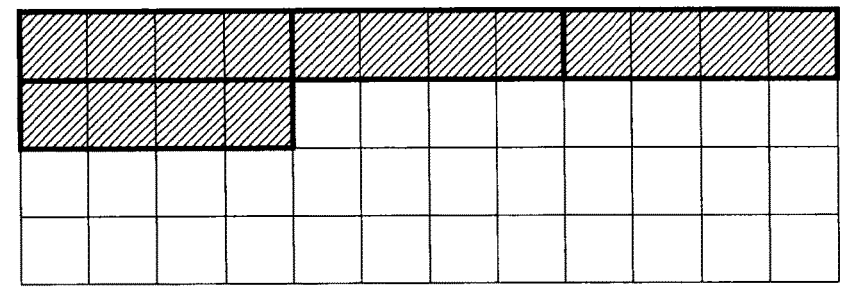

On completion of data transfer of the macroblock line on the first tier, as illustrated in FIG. 13D, similar data transfer proceeds from the left end of the macroblock line on the second tier to the right, so that the local decoded blocks are written to the SRAM 21 four by four. Similar data transfer is repeated onward, so that the reference image is transferred from the image storage 4 to the SRAM 21.

FIGS. 14A to 14D are diagrams illustrating transfer of image data from the image storage 4 to the display processor 6. Transfer of image data from the image storage 4 to the display processor 6 is performed by data transfer using a raster format in a unit of one row from the left end of the image to the right end.

Figure 14A:
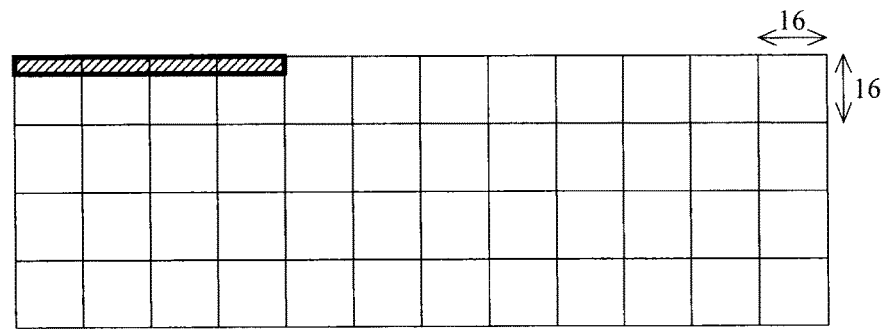
FIGS. 14A to 14D are diagrams illustrating transfer of image data from the image storage to the display processor.

As illustrated in FIG. 14A, burst transfer starting from the top-left corner of an image in a unit of a row across the four local decoded blocks held in the image storage 4 is performed, so that image data of 64 columns×1 row is transferred to the display processor 6.

Figure 14B:
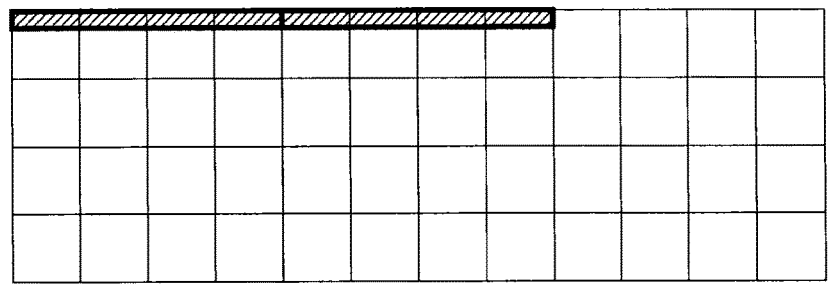
Figure 14C:
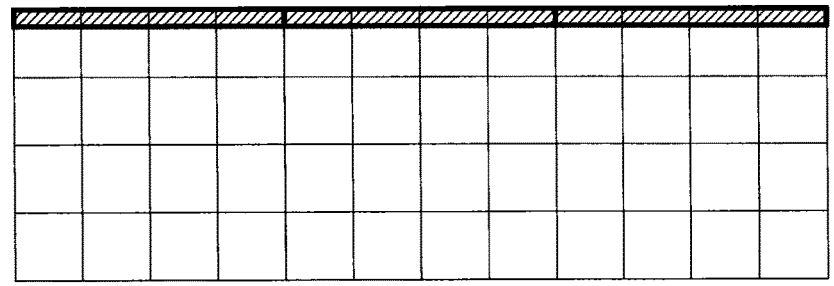

Then as illustrated in FIGS. 14B and 14C, similar data transfer of the first row of the image proceeds to the right, so that image data is transferred to the display processor 6, 64 columns×1 row by 64 columns×1 row.

Figure 14D:
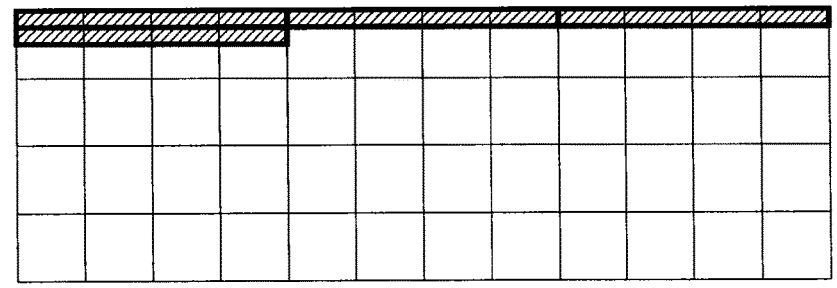

On completion of data transfer of the first row, as illustrated in FIG. 14D, similar data transfer proceeds from the left end of the second row of the image to the right, so that the image data is transferred to the display processor 6, 64 columns×1 row by 64 columns×1 row. Similar data transfer is repeated onward, so that the image data for one frame is transferred from the image storage 4 to the display processor 6.

As described above, according to the image processor 1 of the present embodiment, the SRAM 21 (reference image holding unit) holds a reference image having a horizontally equivalent number of pixels to a horizontal number of pixels of the input image and a number of pixels vertically larger than or equal to a vertical motion search range. Thus the motion search unit 22 is capable of generating an optimal prediction block reliably (that is, with the cache hit ratio of 100%) within a vertical search range on the basis of a reference image held in the SRAM 21. This eliminates the need for a reference image in another region to be read from the image storage 4 to the SRAM 21, avoids occurrence of a read access to the image storage 4, and in consequence, realizes shortening of processing time and reduction in band of a bus.

According to the example illustrated in FIG. 5, the SRAM 21 holds a reference image having a horizontally and vertically equivalent number of pixels respectively to horizontal and vertical number of pixels of the input image. In other words, the SRAM 21 holds a reference image of one frame. Thus the motion search unit 22 is capable of reliably identifying the most highly correlative macroblock to the target input macroblock in the reference image of one frame held in the SRAM 21, and accordingly high accurate prediction block is generated. Moreover, without need for updating a reference image depending on a vertical position of the input macroblock, occurrence of a read access to the image storage 4 is avoided, and in consequence, shortening of processing time and reduction in band of a bus is effectively realized.

According to the image processor 1 of the present embodiment, the local decoded block generator 25 writes the sequentially generated N local decoded blocks to the SRAM 20 (local decoded block holding unit) with the sequentially generated N local decoded blocks aligned row-wise. The SRAM 20 also writes N local decoded blocks held in itself to the image storage 4 by burst transfer in a unit of a row across N local decoded blocks. In other words, processing up to storing of the local decoded blocks in the SRAM 20 is performed in a unit of a macroblock, and writing of the local decoded blocks from the SRAM 20 to the image storage 4 is performed by a memory access using a raster format. Such simple memory access using a raster format achieves a simple way of writing local decoded blocks to the image storage 4. Moreover, burst transfer targeting at N local decoded blocks aligned row-wise in a raster format achieves efficient burst transfer.

According to the image processor 1 of the present embodiment, the SRAM 20 writes pixel data belonging to a first row in N local decoded blocks held therein to a first memory bank of the image storage 4, and writes pixel data belonging to a second row adjacent to the first row to a second memory bank different from the first memory bank. By writing pixel data of adjacent rows to different memory banks, writing of pixel data belonging to the second row is started upon completion of writing of pixel data belonging to the first row. As a result, without latency that would otherwise occur during successive access to the same memory bank, time required for writing is effectively shortened.

According to the example illustrated in FIGS. 9 and 10, the local decoded block generator 25 sequentially writes the local decoded blocks LDB1 to LDB4 to the SRAM 20 during the macroblock terms T1 to T4. Then during the macroblock term T5, the local decoded block generator 25 writes the local decoded block LDB5 to the SRAM 20, and the SRAM 20 writes the local decoded blocks LDB1 to LDB4 to the image storage 4. Thus writing and reading of the local decoded blocks to and from the SRAM 20 are performed concurrently. Moreover, a storage capacity to hold N+1 local decoded blocks is sufficient for the SRAM 20, and thus storage capacity required for the SRAM 20 is reduced in comparison with the example as illustrated in FIGS. 11 and 12 that requires a storage capacity to hold 2N local decoded blocks. According to the image processor 1 of the present embodiment, the image storage 4 writes N local decoded blocks aligned row-wise in the local decoded image to the SRAM 21, by burst transfer in a unit of a row across N local decoded blocks. In other words, reading of the local decoded image from the image storage 4 is performed by a memory access using a raster format. Such simple memory access using a raster format facilitates reading of the local decoded image from the image storage 4. Moreover, burst transfer targeting at N local decoded blocks aligned row-wise in a raster format achieves efficient burst transfer.

According to the image processor 1 of the present embodiment, the image storage 4 transfers a local decoded image held in itself to the display processor 6 by burst transfer in a unit of a row. By storing a local decoded image in a raster format in the image storage 4, image data in a raster format required to display an image on the display 7 is made available for transfer from the image storage 4 to the display processor 6. Thus implementation of a format converter to convert a local decoded image in a codec format to a local decoded image in a raster format is omitted. In consequence, eliminating a need for an access from the format converter to the image storage 4 achieves shortening of delay time, reduction in power consumption, and reduction in band of a bus. Moreover, without a need for a memory access using a codec format, simplification of a design is achieved.

According to the image processor 1 of the present embodiment, the format converter 32 converts a local decoded image in a YUV format (in the above example, YUV420) held in the image storage 4 into another YUV format (in the above example, YUV422) compatible with the display 7. Thus even when the local decoded image held in the image storage 4 is in a YUV format different from the one compatible with the display 7, the YUV format is converted so as to make the image available on the display 7.

<Modification>

In the above embodiment, description is given of an example of displaying a local decoded image generated by the encoder on the display 7. Alternatively, the display 7 may display a decoded image generated by a decoder.

Figure 15:
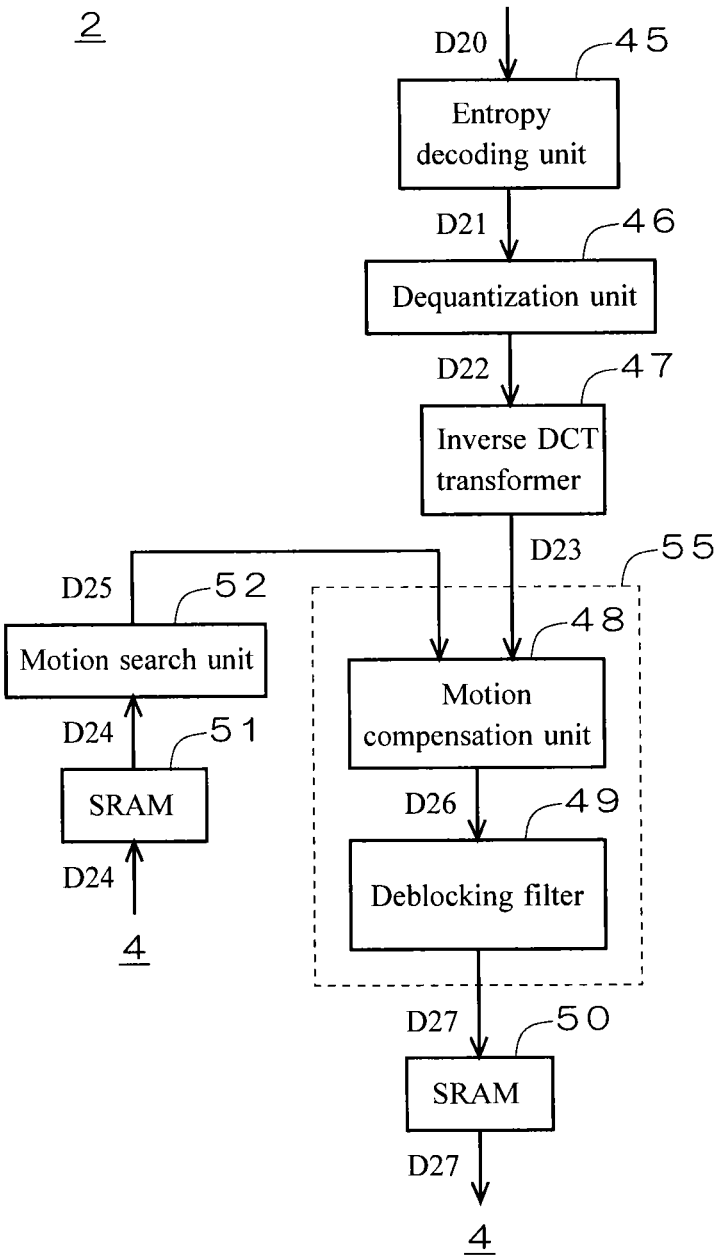
FIG. 15 is a simplified diagram illustrating a configuration of a decoder of the codec processor.

FIG. 15 is a simplified diagram illustrating a configuration of an H.264 decoder of the codec processor 2. FIG. 15 illustrates a relation of connection of the codec processor 2 including an entropy decoding unit 45, a dequantization unit 46, an inverse DCT transformer 47, a motion compensation unit 48, a deblocking filter 49, an SRAM 50, an SRAM 51, and a motion search unit 52. The motion compensation unit 48 and the deblocking filter 49 constitute a decoded block generator 55.

Coded data D20 to be decoded (equivalent to coded data D7 in FIG. 2) is input to the entropy decoding unit 45.

Image data D24 of a reference image is read from the image storage 4 and stored in the SRAM 51, so that the SRAM 51 holds the reference image. The reference image held in the SRAM 51 is similar to one in the above embodiment. In other words, the SRAM 51 holds a reference image having a horizontally equivalent number of pixels to a horizontal number of pixels of the input image and a number of pixels vertically larger than or equal to a vertical motion search range.

The motion search unit 52 performs motion search on the basis of the reference image held in the SRAM 51, to generate a prediction block. Image data D25 of the prediction block is input to the motion compensation unit 48.

The entropy decoding unit 45 performs entropy decoding on the coded data D20 employing CABAC, CAVLC, or the like, and inputs image data D21 equivalent to the image data D6 as illustrated in FIG. 2 to the dequantization unit 46.

The dequantization unit 46 dequantizes the image data D21, and inputs dequantized image data D22 equivalent to the image data D5 as illustrated in FIG. 2 to the inverse DCT transformer 47.

The inverse DCT transformer 47 performs inverse DCT transformation on the image data D22, and inputs inverse DCT-transformed image data D23 equivalent to the image data D4 of the prediction error as illustrated in FIG. 2 to the motion compensation unit 48.

The motion compensation unit 48 reconstitutes the input macroblock equivalent to the image data D1 as illustrated in FIG. 2 on the basis of the image data D25 of the prediction block and the image data D23 of the prediction error, so as to generate a decoded block. Image data D26 of the decoded block is input to the deblocking filter 49.

The deblocking filter 49 performs a predetermined deblocking filtering on the image data D26, and stores the processed image data D27 in the SRAM 50. In other words, the decoded block generator 55 generates the decoded block on the basis of the prediction error (image data D23) and the prediction block (image data D25) and stores the generated decoded block in the SRAM 50.

The image data D27 of the decoded block is transferred from the SRAM 50 to the image storage 4. The image data D27 of the decoded block of all macroblocks included in the input image is transferred to the image storage 4, so that the image storage 4 holds a decoded image. The decoded image is used as a reference image in processing a subsequent input image.

Processing by the decoded block generator 55 to write the decoded block to the SRAM 50 is similar to the above embodiment as illustrated in FIGS. 6A to 6D. Specifically, the decoded block generator 55 sequentially generates four decoded blocks DB1 to DB4, corresponding to N input macroblocks MB1 to MB4 (in this example, N=4) aligned row-wise in the input image. Then the decoded block generator 55 writes the four decoded blocks DB 1 to DB4 to the SRAM 50 with the four decoded blocks DB1 to DB4 aligned row-wise.

Transfer of the decoded blocks from the SRAM 50 to the image storage 4 is similar to the above embodiment as illustrated in FIGS. 7 and 8. In other words, burst transfer in a unit of a row (64 columns×1 row) across the four decoded blocks DB1 to DB4 held in the SRAM 50 is repeated column-wise 16 times, so that the decoded blocks DB1 to DB4 are written to the image storage 4. The image storage 4 includes multiple (in this example, eight) memory banks BK1 to BK8, to different one of which pixel data pieces of adjacent rows are written.

The configuration of the SRAM 50 and a timing for reads and writes of decoded blocks from and to the SRAM 50 are similar to the above embodiment as illustrated in FIGS. 9 to 12.

In the example as illustrated in FIGS. 9 and 10, the decoded blocks DB1 to DB4 are respectively written to the storage areas X1 to X4 during the macroblock terms T1 to T4, and the decoded blocks DB5 to DB8 are respectively written to the storage areas X5 and X1 to X3 during the macroblock terms T5 to T8. Then during the macroblock term T5, the decoded blocks DB 1 to DB4 are read from the storage areas X1 to X4 by burst transfer in a raster format, and the decoded blocks DB5 to DB8 are read from the storage areas X5 and X1 to X3 by burst transfer in a raster format during the macroblock term T9.

In the example as illustrated in FIGS. 11 and 12, the decoded blocks DB1 to DB4 are respectively written to the storage areas X1 to X4 during the macroblock terms T1 to T4, and the decoded blocks DB5 to DB8 are respectively written to the storage areas X5 to X8 during the macroblock terms T5 to T8. During the macroblock term T5, the decoded blocks DB1 to DB4 are read from the storage areas X1 to X4 by burst transfer in a raster format, and during the macroblock term T9, the decoded blocks DB5 to DB8 are read from the storage areas X5 to X8 by burst transfer in a raster format.

Transfer of image data from the image storage 4 to the SRAM 51 is similar to the above embodiment as illustrated in FIGS. 13A to 13D. Specifically, transfer of image data from the image storage 4 to the SRAM 51 is performed by burst transfer using a raster format in a unit of four macroblocks, similar to transfer of the decoded block from the SRAM 50 to the image storage 4.

Transfer of image data from the image storage 4 to the display processor 6 is similar to the above embodiment as illustrated in FIGS. 14A to 14D. Specifically, transfer of image data from the image storage 4 to the display processor 6 is performed by data transfer using a raster format in a unit of one row from the left end of the image to the right end.

According to the image processor 1 of the present modification, the decoded block generator 55 writes the sequentially generated N decoded blocks to the SRAM 50 (decoded block holding unit) with the sequentially generated N decoded blocks aligned row-wise. The SRAM 50 also writes N decoded blocks held in itself to the image storage 4 by burst transfer in a unit of a row across N decoded block. In other words, processing up to storing of the decoded blocks in the SRAM 50 is performed in a unit of a macroblock, and writing of the decoded blocks from the SRAM 50 to the image storage 4 is performed by a memory access using a raster format. Such simple memory access using a raster format achieves a simple way of writing decoded blocks to the image storage 4. Moreover, burst transfer targeting at N decoded blocks aligned row-wise in a raster format achieves efficient burst transfer. The image storage 4 transfers a decoded image in itself to the display processor 6 by burst transfer in a unit of a row. By storing a decoded image in a raster format in the image storage 4, image data in a raster format required to display an image on the display 7 is made available for transfer from the image storage 4 to the display processor 6. Thus implementation of a format converter to convert a decoded image in a codec format to a decoded image in a raster format is omitted. In consequence, eliminating a need for an access from the format converter to the image storage 4 achieves shortening of delay time, reduction in power consumption, and reduction in band of a bus. Moreover, without a need for a memory access using a codec format, simplification of a design is achieved.

According to the image processor 1 of the present modification, the format converter 32 converts a decoded image in a YUV format (in the above example, YUV420) held in the image storage 4 into another YUV format (in the above example, YUV422) compatible with the display 7. Thus even when the decoded image held in the image storage 4 is in a YUV format different from the one compatible with the display 7, the YUV format is converted to make the image available on the display 7.

According to the image processor 1 of the present modification, the SRAM 50 writes pixel data belonging to a first row in the N decoded blocks held therein to a first memory bank of the image storage 4, and writes pixel data belonging to a second row adjacent to the first row to a second memory bank different from the first memory bank. By writing pixel data of adjacent rows to different memory banks, writing of pixel data belonging to the second row is started upon completion of writing of pixel data belonging to the first row. As a result, without latency that would otherwise occur during successive access to the same memory bank, time required for writing is effectively shortened.

According to the example illustrated in FIGS. 9 and 10, the decoded block generator 55 sequentially writes the decoded blocks DB1 to DB4 to the SRAM 50 during the macroblock terms T1 to T4. Then during the macroblock term T5, the decoded block generator 55 writes the decoded block DB5 to the SRAM 50, and the SRAM 50 writes the decoded blocks DB1 to DB4 in the image storage 4. Thus writing and reading of the decoded block to and from the SRAM 50 are performed concurrently. Moreover, a storage capacity to hold N+1 decoded blocks is sufficient for the SRAM 50, and thus storage capacity required for the SRAM 50 is reduced in comparison with the example as illustrated in FIGS. 11 and 12 that requires a storage capacity to hold 2N decoded blocks.

According to the image processor 1 of the present modification, the image storage 4 writes N decoded blocks aligned row-wise in the decoded image to the SRAM 51, by burst transfer in a unit of a row across N decoded blocks. In other words, reading of the decoded image from the image storage 4 is performed by a memory access using a raster format. Such simple memory access using a raster format facilitates reading of the decoded image from the image storage 4. Moreover, burst transfer targeting at N decoded blocks aligned row-wise in a raster format achieves efficient burst transfer.

While the invention has been described in detail, the foregoing description is in all aspects illustrative and not restrictive. It is understood that numerous other modifications and variations can be devised without departing from the scope of the invention.

What is claimed is:

1. An image processor comprising:
a codec processor configured to code an input image; and
an image storage accessible by the codec processor,
the codec processor including circuitry including:
a first memory being configured to hold a reference image from the image storage and a second memory configured to hold a plurality of local decoded blocks.
the circuitry being configured to perform motion search based on the reference image in the first memory to generate a prediction block for a target block in the input image,
the first memory being further configured to hold the reference image having a horizontally equivalent number of pixels to a horizontal number of pixels of the input image and a number of pixels vertically larger than or equal to a vertical motion search range,
the circuitry being further configured to:
generate a prediction error based on the target block and the prediction block,
reconstitute the target block based on the prediction error and the prediction block to generate a local decoded block,
sequentially generate N local decoded blocks corresponding to N target blocks aligned row-wise in the input image, where N is an integer greater than one,
write the N local decoded blocks in row-wise alignment to the second memory, and
write the N local decoded blocks in the second memory to the image storage by burst transfer in a unit of a row across the N local decoded blocks.

2. The image processor according to claim 1,
the first memory is further configured to hold the reference image having a horizontally and vertically equivalent number of pixels respectively to horizontal and vertical number of pixels of the input image.

3. The image processor according to claim 1, wherein the circuitry is further configured to:
generate the prediction error based on the target block and the prediction block;
reconstitute the target block based on the prediction error and the prediction block to generate the local decoded block; and
sequentially generate N local decoded blocks corresponding to N target blocks aligned row-wise in the input image, where N is an integer greater than one, and write the N local decoded blocks in row-wise alignment to the second memory,
the second memory being configured to write the N local decoded blocks therein to the image storage by burst transfer in the unit of the row across the N local decoded blocks.

4. The image processor according to claim 3,
the image storage including a plurality of memory banks,
the second memory being configured to write pixel data in a first row in the N local decoded blocks therein to a first memory bank of the image storage and write pixel data in a second row adjacent to the first row to a second memory bank different from the first memory bank.

5. The image processor according to claim 3,
the second memory being configured to hold N+1 local decoded blocks,
the circuitry being configured to sequentially write first to N-th local decoded blocks to the second memory during the first to N-th block terms, and write an (N+1)-th local decoded block to the second memory, and the second memory being configured to write the first to N-th local decoded blocks to the image storage, during an (N+1)-th block term.

6. The image processor according to claim 3,
the image storage being configured to hold a local decoded image for use as the reference image,
the image storage being configured to write the N local decoded blocks aligned row-wise in the local decoded image to the first memory by burst transfer in the unit of the row across the N local decoded blocks.

7. The image processor according to claim 6, further comprising:
a display processor configured to process image data to display an image on a display,
the image storage being configured to transfer the local decoded image therein to the display processor by burst transfer in the unit of the row,
the display processor being configured to display the image based on the local decoded image from the image storage.

8. The image processor according to claim 7,
the display processor including a format converter configured to convert a YUV format of the local decoded image in the image storage into a YUV format compatible with the display.

9. An image processor comprising:
a codec processor;
a display processor configured to process image data to display an image on a display; and
an image storage accessible by the codec processor and the display processor;

the codec processor including circuitry including:

a first memory configured to hold a reference image from the image storage and a second memory configured to hold a plurality of decoded blocks, the circuitry being configured to:

perform motion search based on the reference image in the first memory to generate a prediction block for a target block;

decode coded data to generate a prediction error;

reconstitute an input image based on prediction block and the prediction error to generate a decoded block; sequentially generate N decoded blocks corresponding to N target blocks aligned row-wise in the input image, where N is an integer greater than one;

write the N decoded blocks in row-wise alignment to the second memory: and write the N decoded blocks in the second memory to the image storage by burst transfer in a unit of a row across the N decoded blocks, the image storage being configured to transfer a decoded image therein to the display processor by burst transfer in the unit of the row, and the display processor being configured to display the image based on the decoded image from the image storage.

10. The image processor according to claim 9, the display processor including a format converter configured to convert a YUV format of the decoded image in the image storage into a YUV format compatible with the display.

11. The image processor according to claim 9, the image storage including a plurality of memory banks, the second memory being configured to write pixel data in a first row in the N decoded blocks therein to a first memory bank in the image storage and write pixel data in a second row adjacent to the first row to a second memory bank different from the first memory bank.

12. The image processor according to claim 9, the second memory being configured to hold N+1 decoded blocks, the circuitry being configured to sequentially write first to N-th decoded blocks to the second memory during first to N-th block terms, and write an (N+1)-th decoded block to the second memory and the second memory being configured to write the first to N-th decoded blocks to the image storage, during an (N+1)-th block term.

13. The image processor according to claim 9, the image storage being configured to write N decoded blocks aligned row-wise in the decoded image to the first memory by burst transfer in the unit of the row across the N decoded blocks.

\* \* \* \* \*